(12) United States Patent
Rowe (10) Patent No.: US 11,384,962 B2
(45) Date of Patent: Jul. 12, 2022

(54) SYSTEM, METHOD AND APPARATUS FOR THE REGENERATION OF NITROGEN ENERGY WITHIN A CLOSED LOOP CRYOGENIC SYSTEM

(71) Applicant: Geoff Rowe, Red Deer (CA)

(72) Inventor: Geoff Rowe, Red Deer (CA)

( * ) Notice: Subject to any disclaimer, the term of this patent is extended or adjusted under 35 U.S.C. 154(b) by 643 days.

(21) Appl. No.: 15/621,249

(22) Filed: Jun. 13, 2017

(65) Prior Publication Data

US 2017/0356677 A1 Dec. 14, 2017

(30) Foreign Application Priority Data

Jun. 13, 2016 (CA) ................................ CA 2932780

(51) Int. Cl.
*F25B 9/00* (2006.01)
*F25J 1/00* (2006.01)
(Continued)

(52) U.S. Cl.
CPC ................ *F25B 9/002* (2013.01); *C09K 5/04* (2013.01); *F25B 9/006* (2013.01); *F25B 9/06* (2013.01);
(Continued)

(58) Field of Classification Search
CPC .......... F25J 1/005; F25J 1/0022; F25J 1/0052; F25J 1/0092; F25J 1/0072; F25J 1/0281;
(Continued)

(56) References Cited

U.S. PATENT DOCUMENTS

| 3,224,207 A | 12/1965 | Feist et al. |
| 3,400,547 A | 9/1968 | Williams et al. |

(Continued)

FOREIGN PATENT DOCUMENTS

| WO | 9930094 A1 | 6/1999 |
| WO | 2006087331 A1 | 8/2006 |
| WO | 2015160593 A1 | 10/2015 |

OTHER PUBLICATIONS

International Search Report issued in corresponding International Patent Application No. PCT/CA2017/050726 dated Sep. 11, 2017.
(Continued)

*Primary Examiner* — Frantz F Jules
*Assistant Examiner* — Webeshet Mengesha
(74) *Attorney, Agent, or Firm* — Finch & Maloney PLLC; Michael J. Bujold; Jay S. Franklin (57) ABSTRACT

A system for the regeneration of nitrogen energy within a closed loop cryogenic system is described. A liquid nitrogen storage is provided in fluid communication with a first flow line. A pump pumps liquid nitrogen from the liquid nitrogen storage to the first flow line. At least one cryogenic cooling loop is provided in fluid communication with the first flow line. The cryogenic cooling loop has an nitrogen intake and a nitrogen outlet with the nitrogen outlet being positioned downstream of the nitrogen intake. The cryogenic cooling loop has a heat exchanger between the nitrogen intake and the nitrogen outlet. A turbo expander used for re-cooling the nitrogen flowing through the first flow line and the at least one cryogenic cooling loop has an inlet and an outlet. The inlet is provided in fluid communication with the first flow line. The turbo expander is connected to a power source. A second flow line connects the outlet of the turbo expander to the liquid nitrogen storage.

17 Claims, 7 Drawing Sheets

(51) Int. Cl.
*F25J 1/02* (2006.01)
*C09K 5/04* (2006.01)
*F25B 9/06* (2006.01)

(52) U.S. Cl.
CPC ............ *F25J 1/005* (2013.01); *F25J 1/0022* (2013.01); *F25J 1/0052* (2013.01); *F25J 1/0072* (2013.01); *F25J 1/0092* (2013.01); *F25J 1/023* (2013.01); *F25J 1/0204* (2013.01); *F25J 1/0212* (2013.01); *F25J 1/0259* (2013.01); *F25J 1/0281* (2013.01); *F25J 1/0288* (2013.01); *F25J 1/0291* (2013.01); *F25J 2220/64* (2013.01); *F25J 2270/42* (2013.01)

(58) Field of Classification Search
CPC .......... F25J 1/0212; F25J 1/023; F25J 1/0204; F25J 1/0259; F25J 1/0288; F25J 1/0291; F25B 9/06; F25B 9/002; F25B 9/006; F25B 11/02; F25B 2400/19; F01K 25/06; F01K 25/08; F01K 25/10; F01K 7/22
See application file for complete search history.

(56) References Cited

U.S. PATENT DOCUMENTS

| | | | |
|---|---|---|---|
| 4,312,188 A * | 1/1982 | Swenson | F02G 1/0435 62/160 |
| 4,445,917 A | 5/1984 | Chiu | |
| 4,829,785 A | 5/1989 | Hersey | |
| 5,755,114 A | 5/1998 | Foglietta | |
| 6,016,665 A | 1/2000 | Cole et al. | |
| 6,250,105 B1 | 6/2001 | Kimble | |
| 6,298,683 B1 * | 10/2001 | Kondo | F25B 7/00 62/335 |
| 6,622,496 B2 | 9/2003 | Cheng et al. | |
| 6,658,891 B2 | 12/2003 | Reijnen et al. | |
| 6,763,680 B2 | 7/2004 | Fischer et al. | |
| 6,907,752 B2 | 6/2005 | Schroeder et al. | |
| 7,111,467 B2 | 9/2006 | Apparao et al. | |
| 7,263,845 B2 | 9/2007 | Lee | |
| 8,020,407 B2 | 9/2011 | Viegas | |
| 8,381,544 B2 | 2/2013 | Coyle | |
| 8,794,319 B2 | 8/2014 | Cerenzie | |
| 2006/0096308 A1 * | 5/2006 | Manole | F25B 40/00 62/277 |
| 2009/0282840 A1 * | 11/2009 | Chen | F01D 15/005 62/50.3 |
| 2010/0275616 A1 | 11/2010 | Saji et al. | |
| 2011/0036121 A1 * | 2/2011 | Roberts | F25J 1/0022 62/612 |
| 2012/0151948 A1 * | 6/2012 | Ogata | F04C 18/3564 62/157 |
| 2014/0144178 A1 | 5/2014 | Terrien et al. | |
| 2014/0157824 A1 | 6/2014 | Turney et al. | |
| 2014/0190205 A1 | 7/2014 | Bonnissel et al. | |
| 2014/0283548 A1 | 9/2014 | He et al. | |
| 2015/0013378 A1 | 1/2015 | He et al. | |
| 2015/0013379 A1 * | 1/2015 | Oelfke | F25J 1/0022 62/612 |
| 2015/0240639 A1 * | 8/2015 | Brokaw | F01K 25/08 184/6.16 |
| 2015/0300719 A1 | 10/2015 | Strickland et al. | |
| 2016/0003527 A1 | 1/2016 | Dean et al. | |
| 2017/0370639 A1 * | 12/2017 | Bardon | F25J 1/0212 |

OTHER PUBLICATIONS

Written Opinion issued in corresponding International Patent Application No. PCT/CA2017/050726 dated Sep. 11, 2017.

* cited by examiner

FIG. 7

SYSTEM, METHOD AND APPARATUS FOR THE REGENERATION OF NITROGEN ENERGY WITHIN A CLOSED LOOP CRYOGENIC SYSTEM

FIELD OF THE DISCLOSURE

The present application relates generally to a system, method and apparatus for regenerating nitrogen (isentropic) energy.

BACKGROUND

This section provides background information to facilitate a better understanding of the various aspects of the invention. It should be understood that the statements in this section of this document are to be read in this light, and not as admissions of prior art.

Nitrogen is a chemical element found on the periodic table with atomic number 7. It is the lightest pnictogen and at room temperature, it is a transparent, odorless diatomic gas. Nitrogen is a common element in the universe, estimated at about seventh in total abundance in the Milky Way and the Solar System. On Earth, the element forms about 78% of Earth's atmosphere and is the most abundant uncombined element. Liquid nitrogen is a cryogenic liquid. At atmospheric pressure, it boils at −195.8° C. (−320.4° F.). When insulated in proper containers such as Dewar flasks, it can be transported without much evaporative loss.

Many different fluids, or refrigerants, may be used in heat exchangers depending upon the temperature to be achieved. In many cases, the refrigerants are not reused as the energy requirements to re-cool it for use make the process inefficient. In a conventional refrigeration cycle, the refrigerant expands in an exchanger to produce a mixture of liquid and vapor at the boiling point (commonly referred to as saturation levels). As this mixture passes through the exchanger, it remains at the boiling point until the liquid has evaporated, at which point the temperature of the vapor begins to rise. The heat capacity and temperature of the refrigerant may be optimized by using multiple, or larger, expanders.

BRIEF SUMMARY

There is provided a system for the regeneration of nitrogen energy within a closed loop cryogenic system. The system has a liquid nitrogen storage with an inlet and an outlet. A first flow line has a first end and a second end. The first end of the first flow line is in fluid communication with the outlet of the liquid nitrogen storage. A pump is provided for pumping the liquid nitrogen from the liquid nitrogen storage to the first flow line. A turbo expander that is used for re-cooling nitrogen that flows through the first flow line is connected to the first flow line. The turbo expander has an inlet and an outlet. The inlet of the turbo expander is connected to the second end of the first flow line. The outlet of turbo expander is connected to a first end of a second flow line. The turbo expander is connected to a power source. The second end of the second flow line is provided in fluid communication with the inlet of the liquid nitrogen storage. At least one cryogenic cooling loop is provided. The at least one cryogenic cooling loop has a nitrogen intake and a nitrogen outlet, both of which are in fluid communication with the first flow line. The nitrogen outlet is positioned downstream of the nitrogen intake. The cryogenic cooling loop has a heat exchanger positioned between the nitrogen intake and the nitrogen outlet.

In one embodiment, a valve is positioned between the nitrogen intake and the heat exchanger of the cryogenic cooling loop. The valve controls the flow of nitrogen through the at least one cryogenic cooling loop.

In one embodiment, one cryogenic cooling loop is provided in fluid communication with the first flow line.

In another embodiment, two cryogenic cooling loops, a first cryogenic cooling loop and a second cryogenic cooling loop, are provided in fluid communication with the first flow line. The nitrogen intake of the second cryogenic cooling loop is upstream of the nitrogen outlet of the first cryogenic cooling loop.

In one embodiment, a throttle valve is provided in the first flow line upstream of the nitrogen outlet of the at least one cryogenic cooling loop and downstream of the nitrogen intake of the at least one cryogenic cooling loop. The throttle valve is used to balance the pressure in the first flow line as needed.

In one embodiment, a heat exchanger is provided in the first flow line downstream of the nitrogen outlet of the at least one cryogenic cooling loop. The heat exchanger is used to cool or heat the nitrogen in the flow line before it travels through the turbo expander.

In one embodiment, the nitrogen storage has a vent for venting off excess pressure within the nitrogen source.

In one embodiment, the power source for the turbo expander is a natural gas generator.

In one embodiment, a surge tank is provided in the first flow line upstream of the turbo expander and downstream of the at least one cryogenic cooling loop. The surge tank may allow for complete vaporization of entrained liquids flowing into the turbo expander. This may prevent cavitation of the turbo expander. In the alternative, the surge tank may be utilized to pre-cool the nitrogen stream prior to the nitrogen stream entering the turbo expander.

In one embodiment, methane gas is added to the nitrogen flowing through the system. Ethane gas may also be added to the nitrogen flowing through the system. The addition of these gases may allow for greater gas density and improved energy transmission across the heat exchangers within the at least one cryogenic cooling loops.

There is also provided a method for regenerating nitrogen energy within a closed loop cryogenic system. Liquid nitrogen is pumped from a liquid nitrogen storage into a first flow line. The first flow line has a first end is in fluid communication with the liquid nitrogen storage and a second end. At least a portion of the liquid nitrogen flows through at least one cryogenic cooling loop. The at least one cryogenic cooling loop has a nitrogen intake and a nitrogen outlet in fluid communication with the first flow line. The nitrogen intake of the cryogenic cooling loop is positioned upstream of the nitrogen outlet of the cryogenic cooling loop. The cryogenic cooling loop has a heat exchanger positioned between the nitrogen intake and the nitrogen outlet. The nitrogen flows into a turbo expander through an inlet. The inlet of the turbo expander is in fluid communication with the second end of the first flow line. The turbo expander re-cools the nitrogen that flows through the first flow line and the at least one cryogenic cooling loop.

In one embodiment, the re-generated liquid nitrogen is flowed through a second flow line and through the inlet of the liquid nitrogen storage. The second flow line has a first end and a second end. The first end of the second flow line is in fluid communication with the outlet of the turbo expander and the second end of the second flow line is in fluid communication with the inlet of the liquid nitrogen storage.

In one embodiment the regenerated liquid nitrogen bypasses the storage vessel and continues directly to the inlet of the first heat exchanger.

In one embodiment, the re-generated gaseous super cooled nitrogen bypasses the storage vessel and continues directly to the inlet of the first heat exchanger.

In one embodiment, the re-generated gaseous super cooled mixed refrigerant bypasses the storage vessel and continues directly to the inlet of the first heat exchanger.

In one embodiment, an additional step of passing the nitrogen through a heat exchanger is completed before flowing the nitrogen through the turbo expander. The heat exchanger is positioned on the first flow line downstream of the nitrogen outlet of the at least one cryogenic cooling loop. The heat exchanger cools or heats the nitrogen passing through it.

In one embodiment, one cryogenic cooling loop is provided in fluid communication with the first flow line.

In another embodiment, two cryogenic cooling loops, a first cryogenic cooling loop and a second cryogenic cooling loop, are provided in fluid communication with the first flow line. The nitrogen intake of the second cryogenic cooling loop is upstream of the nitrogen outlet of the first cryogenic cooling loop.

In one embodiment, a further step of passing the nitrogen through a surge tank prior to flowing the nitrogen through the turbo expander is taken. The surge tank may allow for complete vaporization of entrained liquids flowing into the turbo expander. This may prevent cavitation of the turbo expander. In the alternative, the surge tank may be utilized to pre-cool the nitrogen stream prior to the nitrogen stream entering the turbo expander.

In one embodiment, methane gas is added to the nitrogen flowing through the system. Ethane gas may also be added to the nitrogen flowing through the system. The addition of these gases may allow for greater gas density and improved energy transmission across the heat exchangers within the at least one cryogenic cooling loops.

There is also provided an apparatus for using nitrogen in a closed loop cryogenic system that has a cryochamber, a turbo expander and at least one storage tank. The cryochamber has a first nitrogen flow line that has an inlet for connection to a nitrogen source and at outlet. At least one cryogenic cooling loop is provided with a nitrogen inlet and a nitrogen outlet in fluid communication with the first nitrogen flow line. The nitrogen inlet is positioned upstream of the nitrogen outlet. The at least one cryogenic cooling loop has a heat exchanger through which the nitrogen passes. The heat exchanger has a fluid inlet for introducing fluid to be cooled in the heat exchanger and a fluid outlet for discharging the fluid cooled in the heat exchanger. The turbo expander has an inlet in fluid communication with the outlet of the first nitrogen flow line and an outlet in fluid communication with the nitrogen source. The turbo expander re-cools the nitrogen that passes through the at least one cryogenic cooling loop and the first nitrogen flow line positioned within the cryochamber. The at least one storage tank is provided in fluid communication with the fluid outlet of the heat exchanger positioned within the at least one cryogenic cooling loop.

In one embodiment, the cryochamber is enclosed with insulated walls.

In one embodiment, the turbo expander is enclosed with insulated walls.

In one embodiment, the insulated walls enclosing the cryochamber have at least one access door. The insulated walls enclosing the turbo expander may also have at least one access door. Access doors allow for entry into the cryochamber area and the area housing the turbo expander for maintenance and inspection of parts as needed.

In one embodiment, the cryochamber has a heat exchanger positioned on the first nitrogen flow line downstream of the nitrogen outlet of the cryogenic cooling loop.

In one embodiment, a flow control valve is provided on the first nitrogen flow line between the nitrogen inlet and the nitrogen outlet of the cryogenic cooling loop. The flow control valve is used to balance the pressure in the first flow line as needed.

In one embodiment, a flow control valve is positioned in the at least one cryogenic cooling loop adjacent to the nitrogen inlet. The flow control valve controls the pressure within the cryogenic cooling loop and may also be used to stop and start the flow of liquid nitrogen through the at least one cryogenic cooling loop.

In one embodiment, the cryochamber, the turbo expander and the at least one storage tank are mounted on a skid. In a preferred embodiment, the skid has a steel grate surface on which the cryochamber, turbo expander and at least one storage tank are mounted.

In one embodiment, a flare line is connected to the at least one storage tank as a safety feature to allow for the flaring off of gases as needed.

In one embodiment, a surge tank is provided in the first flow line upstream of the turbo expander and downstream of the at least one cryogenic cooling loop. The surge tank may allow for complete vaporization of entrained liquids flowing into the turbo expander. This may prevent cavitation of the turbo expander. In the alternative, the surge tank may be utilized to pre-cool the nitrogen stream prior to the nitrogen stream entering the turbo expander.

In one embodiment, methane gas is added to the nitrogen flowing through the system. Ethane gas may also be added to the nitrogen flowing through the system. The addition of these gases may allow for greater gas density and improved energy transmission across the heat exchangers within the at least one cryogenic cooling loops.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

A system for the regeneration of nitrogen energy within a closed loop cryogenic system, generally identified by reference numeral 10, will be described with reference to FIG. 1 through FIG. 4 and FIG. 7. An apparatus for using nitrogen in a closed loop system, generally identified by reference numeral 100, will be described with reference to FIG. 5 and FIG. 6.

Figure 1:
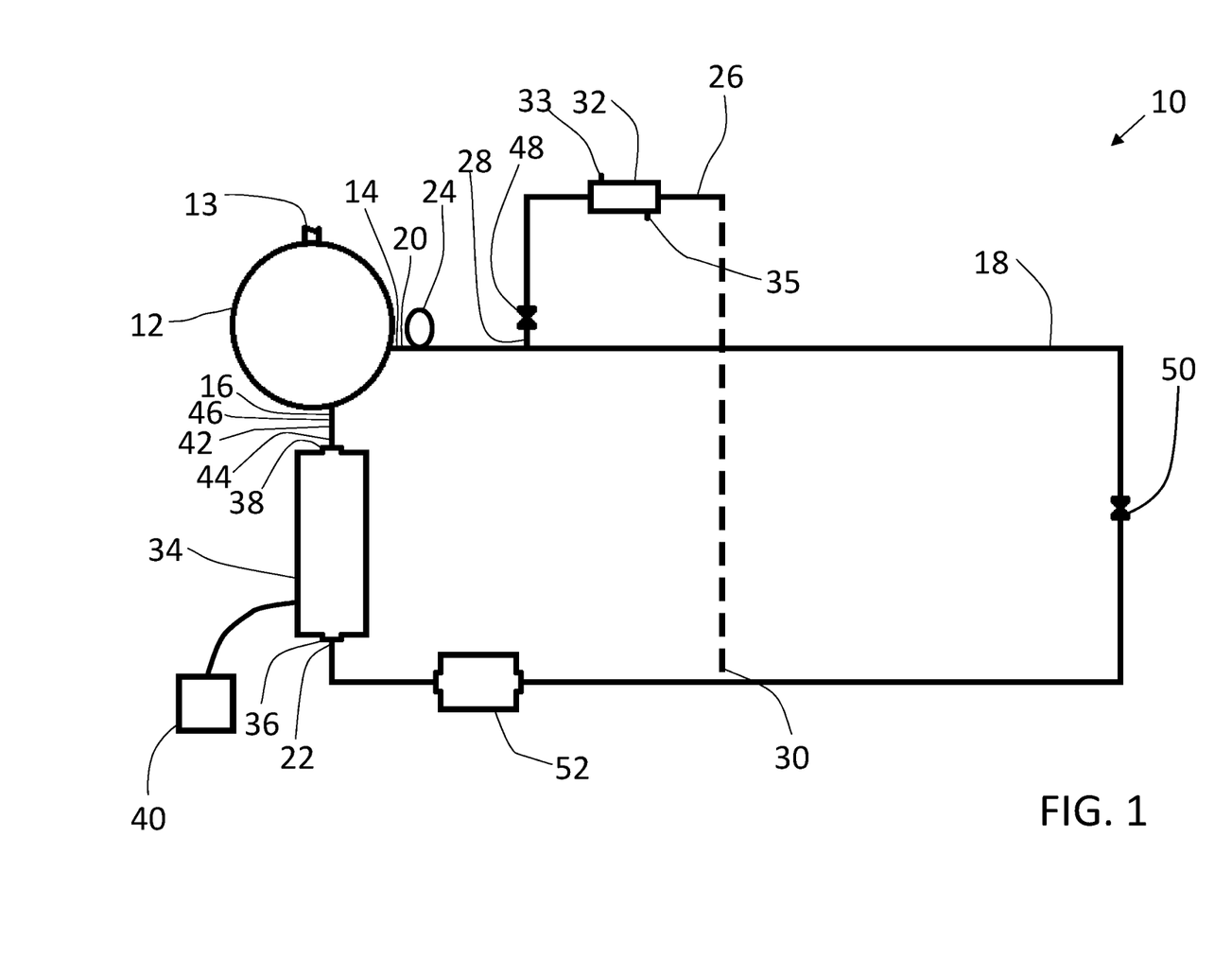
FIG. 1 is a schematic view of a system for the regeneration of nitrogen energy within a closed loop cryogenic system with a single cryogenic cooling loop.

Referring to FIG. 1, system 10 is designed to work as a closed loop system and allows for the regeneration of liquid nitrogen used in a heat exchanger to cool fluids. Liquid nitrogen from a liquid nitrogen storage 12 is used as a cooling media. Liquid nitrogen storage 12 has an outlet 14 and an inlet 16. For safety purposes, liquid nitrogen storage 12 may have a vent 13 for venting off gaseous nitrogen that can build up and increase pressure within liquid nitrogen storage 12. A first flow line 18 has a first end 20 and a second end 22. First end 20 of first flow line 18 is provided in fluid communication with outlet 14 of liquid nitrogen storage 12. A pump 24 is provided for pumping liquid nitrogen from liquid nitrogen storage 12 to first flow line 18. Generally, liquid nitrogen storage 12 is a nitrogen bulker with an off-loading pump 24. However, a person of skill will understand that different types of pumps may be used and the location of the pump will be dependent upon the type of pump used. A cryogenic cooling loop 26 has a nitrogen intake 28 and a nitrogen outlet 30. Each of nitrogen intake 28 and nitrogen outlet 30 are provided in fluid communication with first flow line 18. Nitrogen intake 28 is positioned on first flow line 18 upstream of nitrogen outlet 30. Cryogenic cooling loop 26 has a heat exchanger 32 positioned between nitrogen intake 28 and nitrogen outlet 30. Heat exchanger 32 is used to cool fluids, such as liquefied natural gases, to a predetermined temperature during cryogenic cooling processes. Heat exchanger 32 has a fluid inlet 33 through which fluids to be cooled flow into heat exchanger 32 and a fluid outlet 35 through which cooled fluids exit heat exchanger 32.

A turbo expander 34 with an inlet 36 and an outlet 38 is provided for re-cooling nitrogen flowing through the first flow line and the at least one cryogenic cooling loop. Inlet 36 of turbo expander 34 is connected to second end 22 of first flow line 18. Turbo expander 34 is connected to a power source 40. In the embodiment shown, power source 40 is a natural gas generator. A person of skill will understand that different types of power sources may be used for powering turbo expander 34. Turbo expander 34 may be run on methane/ethane produced through heat exchangers 32*a* or 32*b* when set up in such a fashion. A methane/ethane outlet, not shown, could be provided in fluid communication with turbo expander 34 for use as a fuel to power turbo expander 34. A second flow line 42 connects turbo expander 34 to liquid nitrogen storage 12. Second flow line 42 has a first end 44 and a second end 46. First end 44 of second flow line 42 is provided in fluid communication with outlet 38 of turbo expander 34. Second end 46 of second flow line 42 is provided in fluid communication with inlet 16 of liquid nitrogen storage 12. Although not shown, it will be understood by a person skilled in the art that second flow line 42 may by-pass liquid nitrogen storage 12 and connect to first flow line 18 between outlet 14 and nitrogen intake 28 of cryogenic cooling loop 26.

A valve 48 may be positioned between nitrogen intake 28 and heat exchanger 32 for controlling the flow of nitrogen through cryogenic cooling loop 26. Valve 48 can be used to turn off the flow of nitrogen through cryogenic cooling loop 26 or may be used to change the pressure of nitrogen flowing through cryogenic cooling loop 26. A throttle valve 50 may be provided in first flow line 18 upstream of nitrogen outlet 30 of cryogenic cooling loop 26 and downstream of nitrogen intake 28. Throttle valve 50 is used to balance the pressure within first flow line 18 on either side of throttle valve 50 as needed. Throttle valve 50 may also be used to inject nitrogen that has not been warmed through heat exchanger 32 downstream to lower the temperature downstream of valve 50.

To reduce the amount of work completed by turbo expander 34, it may be beneficial for the pressure within flow line 18 downstream of throttle valve 50 be approximately 1000 psi. In one example, pressure within flow line 18 is created by off-loading pump 24 at approximately 120 psi. Throttle valve 50 and valve 48 may be used to affect the pressure downstream of throttle valve 50 and valve 48.

Figure 2:
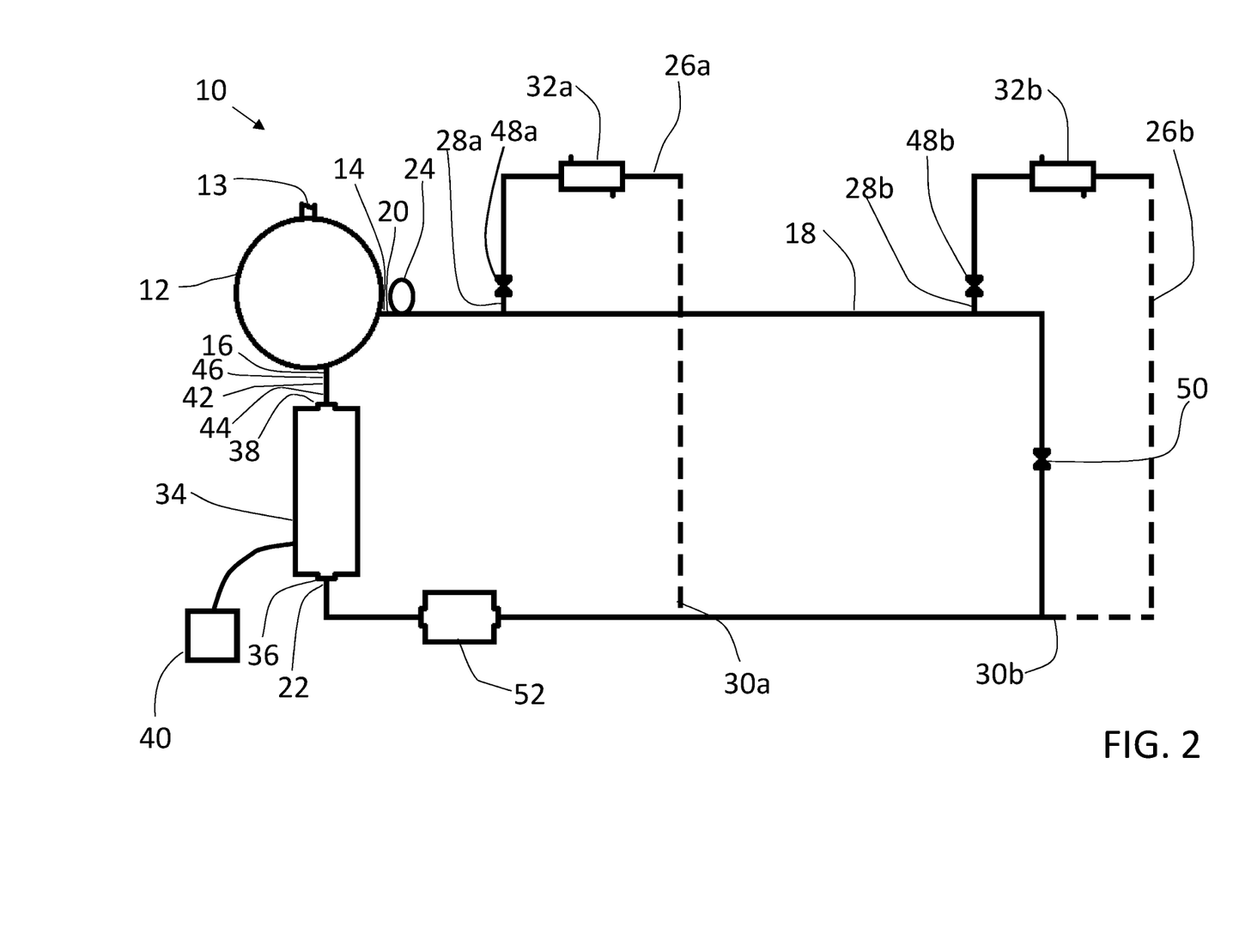
FIG. 2 is a schematic view of a system for the regeneration of nitrogen energy within a closed loop cryogenic system with two cryogenic cooling loops.

Referring to FIG. 2, system 10 may have a first cryogenic cooling loop 26*a* and a second cryogenic cooling loop 26*b*. The nitrogen intake 28*b* of second cryogenic cooling loop 26*b* is positioned upstream of the nitrogen outlet 30*a* of the first cryogenic cooling loop. Liquid nitrogen exiting through outlet 14 of liquid nitrogen storage 12 is approximately −196° C. The liquid nitrogen travelling through first flow line 18 remains close to −196° C. until nitrogen used in first cryogenic cooling loop 26*a* and second cryogenic cooing loop 26*b* flows back into first flow line 18 through nitrogen outlet 30*a* and 30*b*, respectively. A person of skill will understand that some fluctuation of temperature from −196° C. will occur within first flow line 18 due to heat transfer from ambient air temperatures. The amount of fluctuation is dependent upon the ambient temperature of the surround air and the type and/or amount of insulation provided around first flow line 18. The temperature to which each heat exchanger 32*a* and 32*b* cools the fluid travelling through it is independent of each other. For example, heat exchanger 32*a* may cool the fluid travelling through it to −50° C., while heat exchanger 32*b* may cool the fluid travelling through it to −128° C. A person of skill will understand that the temperature to which each heat exchanger cools fluid travelling through it is varied through the use of different types of heat exchangers and through flow and volume restrictions.

By positioning both nitrogen intake 28*a* and 28*b* upstream of both nitrogen outlet 30*a* and 30*b*, the temperature of the nitrogen flowing into nitrogen intake 28*a* and 28*b* is relatively the same. This allows heat exchanger 32*b* in second cryogenic cooling loop 26*b* to cool fluids to the same degree as heat exchanger 32*a* in first cryogenic cooling loop 26*a* if desired. If nitrogen outlet 30*a* of first cryogenic cooling loop 26*a* were to be positioned upstream of nitrogen intake 28*b* of second cryogenic cooling loop 26*b*, the temperature of nitrogen travelling into second cryogenic cooling loop 26*b* would be higher than the temperature of nitrogen travelling into first cryogenic cooling loop 26*a*. This would limit the ability of heat exchanger 32*b* in second cryogenic cooling loop 26*b* to cool fluids flowing through it. The temperature of the nitrogen flowing through first flow line 18 after the reintroduction of nitrogen used in first cryogenic cooling loop 26*a* or second cryogenic cooling loop 26*b* is dependent upon the heat transfer in heat exchanger 32*a* or 32*b*, respectively. As can be seen, throttle valve 50 is positioned upstream of both nitrogen outlets 30*a* and 30*b* and downstream of both nitrogen inlets 28*a* and 28*b*.

Figure 3:
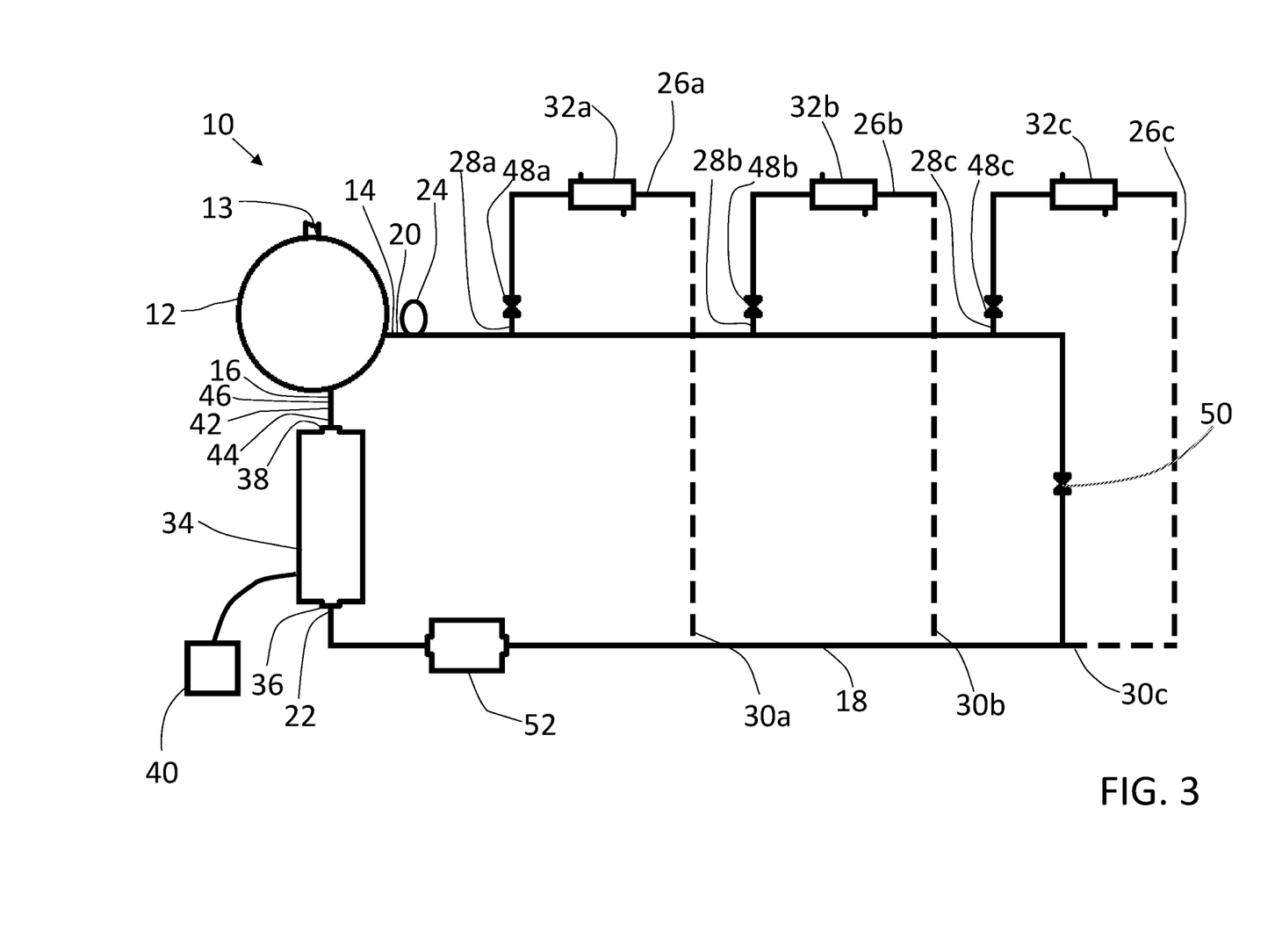
FIG. 3 is a schematic view of a system for the regeneration of nitrogen energy within a closed loop cryogenic system with three cryogenic cooling loops.
Figure 4:
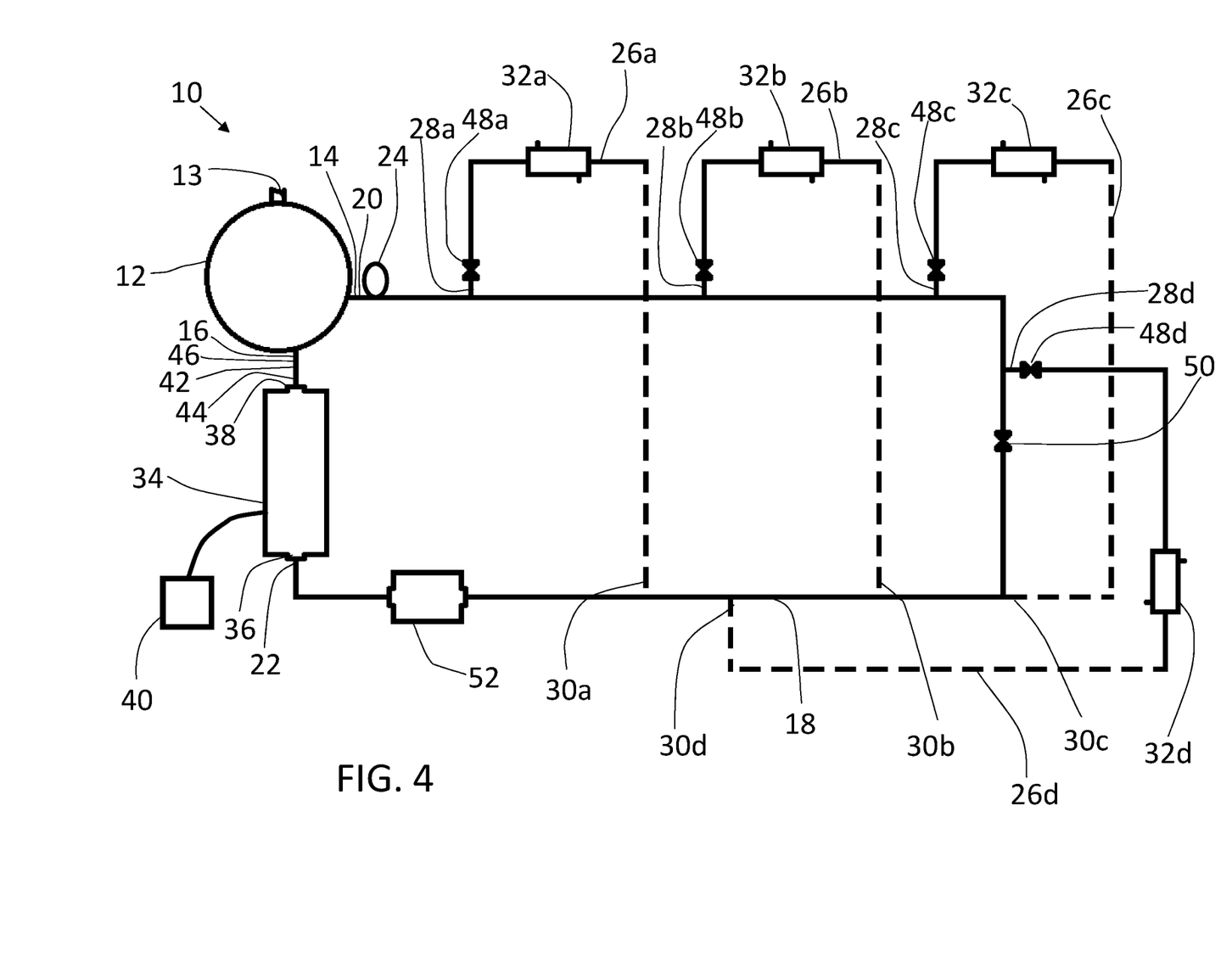
FIG. 4 is a schematic view of a system for the regeneration of nitrogen energy within a closed loop cryogenic system with four cryogenic cooling loops.

Referring to FIG. 3 and FIG. 4, system 10 may have more than two cryogenic cooling loops 26*a*, 26*b*, 26*c* and 26*d*. In each of the embodiments shown, the nitrogen intakes 28*a*, 28*b*, 28*c* and 28*d* are positioned upstream of nitrogen outlets 30*a*, 30*b*, 30*c* and 30*d*. As can be seen, throttle valve 50 is positioned in first flow line 18 upstream of nitrogen outlets 30*a*, 30*b*, 30*c* and 30*d* of cryogenic cooling loops 26*a*, 26*b*, 26*c* and 26*d* and downstream of nitrogen intakes 28*a*, 28*b*, 28*c* and 28*d*. Throttle valve 50 is used to balance the pressure within first flow line 18 on either side of throttle valve 50 as needed.

A heat exchanger 52 may be positioned in first flow line 18 downstream of nitrogen outlet 30*a*, 30*b*, 30*c* and 30*d*. Heat exchanger 52 may be used to either pre-cool or pre-heat the nitrogen flowing through first flow line 18. The temperature of nitrogen flowing through first flow line 18 will increase as used nitrogen flows through nitrogen outlets 30*a*, 30*b*, 30*c* and 30*d* of cryogenic cooling loops 26*a*, 26*b*, 26*c* and 26*d*. Pre-cooling is beneficial for lower loads of nitrogen and for larger volumes. Pre-cooling may improve efficiency within turbo expander 34. Heating of the nitrogen should only occur if there are issues in turbo expander 34 related to saturation of the nitrogen. Heating of the nitrogen may be used to prevent cavitation of the internal mechanisms in turbo expander 34. Generally, however, nitrogen saturation issues can be resolved by oscillating or adjusting the flow rate and volumes of nitrogen travelling through system 10. This expansion process is reversible, meaning that the gas is in thermodynamic equilibrium at all times, called isentropic expansion. In this scenario, the gas does positive work during the expansion, as the temperature decreases effecting the latent heat energy requirements of the condensing system. This method may be used to complete a phase change from a gaseous to a liquid medium dependent on application and system requirements.

Alternatively, the cooling process may be stopped prior to phase change to maintain a super-cooled gaseous refrigerant without crossing the phase envelope, depending on latent heat requirements and mass flow required through the exchangers. These factors will be predetermined dependent on the feedstock composition and apparatus application.

Figure 7:
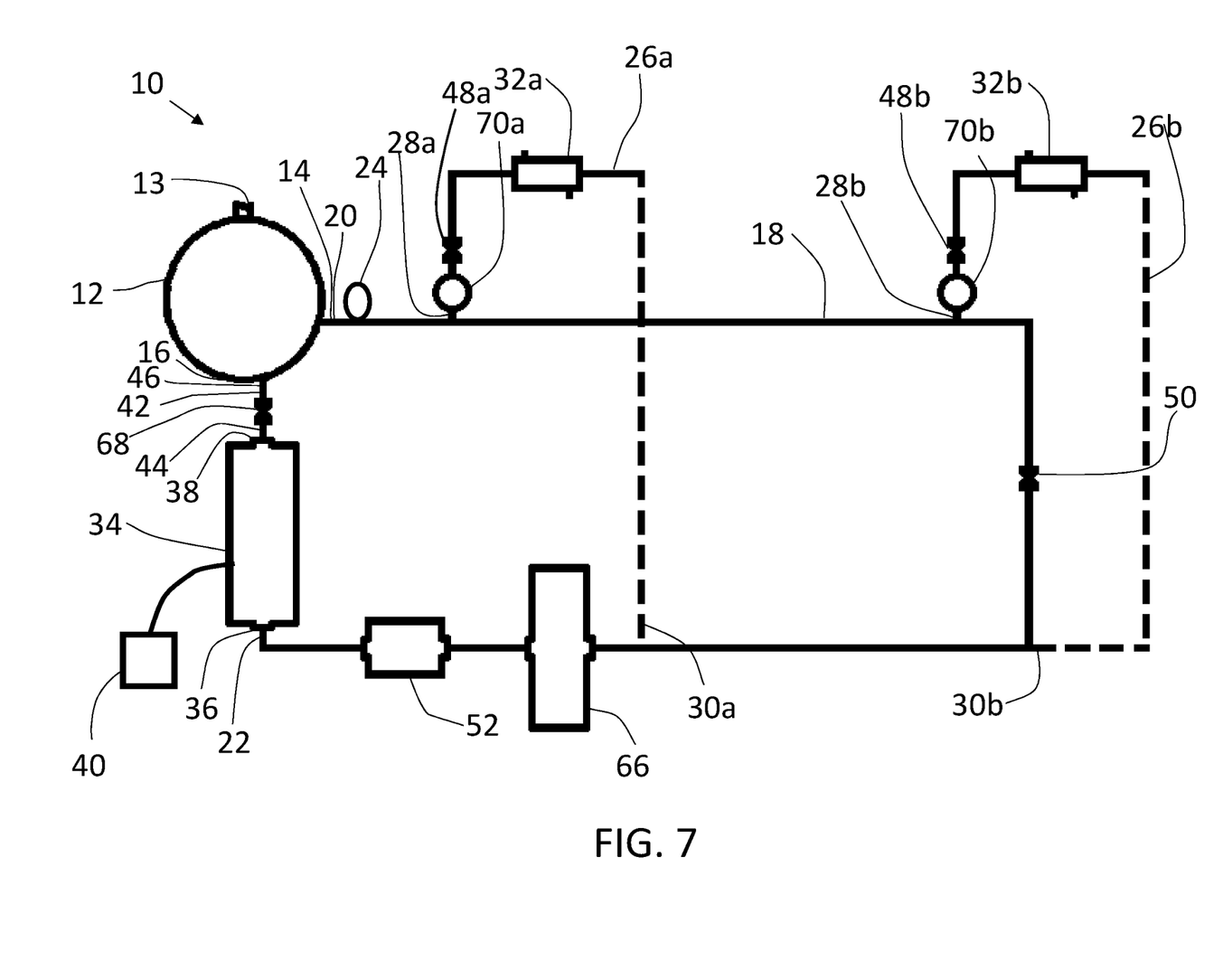
FIG. 7 is a schematic view of a system for the regeneration of nitrogen energy within a closed loop cryogenic system with a surge tank.

Referring to FIG. 7, a surge tank 66 is positioned downstream of outlets 30*a* and 30*b*. A person of skill will understand that surge tank 66 should be positioned downstream of all nitrogen outlets when more than two, or a single, nitrogen outlet is present. Surge tank 66 provides turbo expander 34 with a supply of fluid.

Liquid nitrogen cryogenic liquid pumps 70*a* and 70*b* may be positioned downstream of nitrogen inlets 28*a* and 28*b* and upstream of heat exchangers 32*a* and 32*b* to be used in the event that nitrogen needs to be forced across heat exchangers 32*a* and 32*b*. Nitrogen may need to be forced across heat exchangers 32*a* and 32*b* when flow line 18 is narrower in diameter than pipes used in cooling loops 26*a* and 26*b*. It may also be necessary to force nitrogen across heat exchangers 32*a* and 32*b* when the downstream pressure is higher than the pressure of nitrogen travelling through cooling loops 26*a* and 26*b*. A person of skill will understand that other reasons for forcing nitrogen across heat exchangers 32*a* and 32*b* may be present.

In the embodiment shown, a valve 68 is positioned on second flow line 42 between turbo expander 34 and inlet 16. Valve 68 is generally a JT valve that is used to enable a more efficient startup and shutdown of turbo expander 34. It may also be used to continue the process should turbo expander 34 go offline or if flow increases beyond the full speed capacity of turbo expander 34. Depending on the desired efficiency, valve 68 may be bypassed or function in full open position if no additional cooling is required beyond −171 Celsius.

The introduction of methane and/or ethane gases to the nitrogen used in system 10 may balance energy demands as a mixed refrigerant. The inclusion of methane and/or ethane with the nitrogen may allow for greater gas density and energy that can be used in cryogenic cooling loops 26. Methane and/or ethane may be introduced into liquid nitrogen storage 12 or at any point along first flow line 18 or second flow line 42. By way of example only, the refrigerant may consist of 80% nitrogen, 15% methane and 5% ethane. A person of skill will understand that more or less methane and ethane may be introduced depending upon the desired density, availability of methane and ethane and efficiency of cooling.

Figure 5:
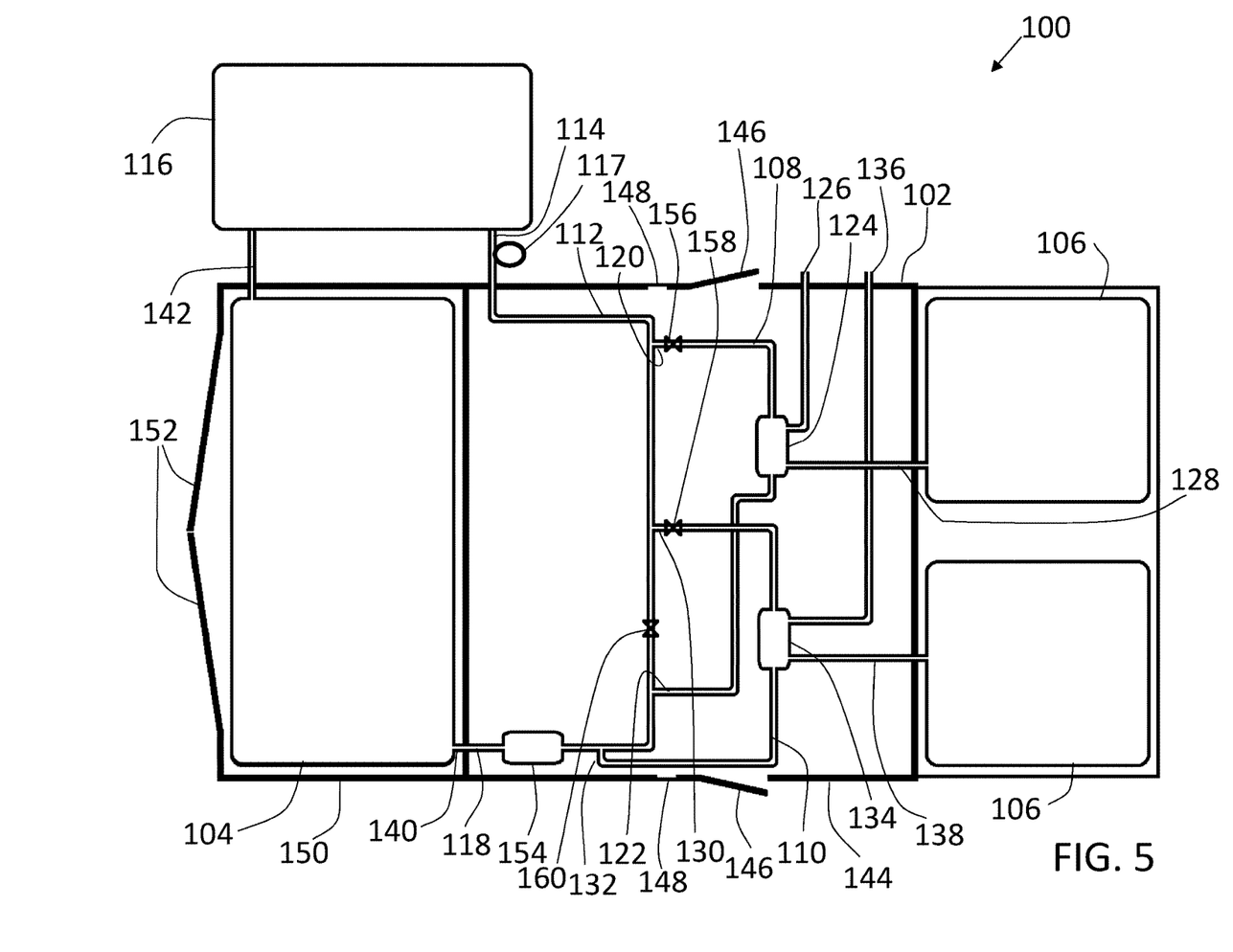
FIG. 5 is a schematic view of an apparatus for using nitrogen in a closed loop system.

Apparatus 100 utilizes system 10 for the cooling of various fluids. The type of fluid to be cooled is dependent upon the fluids being produced and collected by the user. Referring to FIG. 5, apparatus 100 has a cryochamber 102, a turbo expander 104 and storage tanks 106. Cryochamber 102 houses first cryogenic cooling loop 108 and second cryogenic cooling loop 110. A person of skill will understand that the number of cryogenic cooling loops housed within cryochamber 102 may be altered to suit the needs of the user. Cryochamber 102 has a first nitrogen flow line 112 that has an inlet 114 for connection to a nitrogen source 116 and an outlet 118. Generally, nitrogen source 116 is a nitrogen bulker with an offloading pump 117, however a person of skill will understand that different types of nitrogen sources 116 may be used. Pump 117 pumps liquid nitrogen from nitrogen source 116 into first nitrogen flow line 112. First cryogenic cooling loop 108 has a nitrogen inlet 120 and a nitrogen outlet 122 in fluid communication with first nitrogen flow line 112. Nitrogen inlet 120 is positioned upstream of nitrogen outlet 122. First cryogenic cooling loop 108 has a heat exchanger 124 through which the nitrogen passes. Heat exchanger 124 has a fluid inlet 126 for introducing fluid to be cooled into heat exchanger 124 and a fluid outlet 128 for discharging the fluid cooled in heat exchanger 124. Fluid outlet 128 is placed in fluid communication with a storage tank 106. Second cryogenic cooling loop 110 has a nitrogen inlet 130 and a nitrogen outlet 132 in fluid communication with first nitrogen flow line 112. Nitrogen inlet 130 is positioned upstream of nitrogen outlet 132 and nitrogen outlet 122. Second cryogenic cooling loop 110 has a heat exchanger 134 through which the nitrogen passes. Heat exchanger 134 has a fluid inlet 136 for introducing fluid to be cooled into heat exchanger 134 and a fluid outlet 138 for discharging the fluid cooled in heat exchanger 134. Fluid outlet 138 is placed in fluid communication with a storage tank 106. A person of skill will understand that fluid outlets 128 and 138 may be connected to the same or different storage tanks 106 dependent upon the products being discharged from heat exchanger 124 and 134, respectively and the preference of the user. Turbo expander 104 has an inlet 140 in fluid communication with outlet 118 of first nitrogen flow line 112 and an outlet 142 in fluid communication with nitrogen source 116. Turbo expander 104 re-cools the nitrogen that passes through first flow line 112, first cryogenic cooling loop 108 and second cryogenic cooling loop 110.

Cryochamber 102 is preferably enclosed within insulated walls 144. Insulated walls 144 provide a barrier between the cold nitrogen flowing through first nitrogen flow line 112, first cryogenic cooling loop 108 and second cryogenic cooling loop 110 from the rest of apparatus 100. Insulated walls 144 have an access door 146 through which the elements within cryochamber 102 can be reached for maintenance or inspection purposes. In the present embodiment, inlet 114 of first nitrogen flow line 112, fluid inlet 126 of heat exchanger 124 and fluid inlet 136 of heat exchanger 134 each extend beyond insulated walls 144. This allows for connection to the appropriate sources of fluid without the requirement of entering cryochamber 102. Insulated walls 144 may also be equipped with vents or fans 148 to allow for circulation of air through cryochamber. The ambient temperature inside cryochamber 102 may reach very cold temperatures. The air circulation is a safety precaution to prevent a possible IDLH (immediately dangerous to life or health) environment. Air circulation may also prevent extreme temperature changes that could damage apparatus 100 infrastructure. Turbo expander 104 may also be enclosed within insulated walls 150. Insulated walls 150 are provided with access doors 152 to allow access to turbo expander 104 for maintenance and inspection purposes.

A heat exchanger 154 may be positioned in first nitrogen flow line 112 downstream of nitrogen outlet 122 and 132. Heat exchanger 154 may be used to either pre-cool or pre-heat the nitrogen flowing through first nitrogen flow line 112. The temperature of nitrogen flowing through first nitrogen flow line 112 will increase as used nitrogen flows through nitrogen outlets 122 and 132 of first cryogenic cooling loop 108 and second cryogenic cooling loop 110, respectively. Pre-cooling is beneficial for lower loads of nitrogen and for larger volumes. Pre-cooling may improve efficiency within turbo expander 34. Heating of the nitrogen should only occur if there are issues in turbo expander 34 related to saturation of the nitrogen. Heating of the nitrogen may be used to prevent cavitation of the internal mechanisms in turbo expander 34. Generally, however, nitrogen saturation issues can be resolved by oscillating or adjusting the flow rate and volumes of nitrogen travelling through system.

A valve 156 may be positioned between nitrogen intake 120 and heat exchanger 124 for controlling the flow of nitrogen through first cryogenic cooling loop 120. Valve 156 can be used to turn off the flow of nitrogen through first cryogenic cooling loop 120 or may be used to change the pressure of nitrogen flowing through first cryogenic cooling loop 120. A valve 158 may be positioned between nitrogen intake 130 and heat exchanger 134 for controlling the flow of nitrogen through second cryogenic cooling loop 130. Valve 158 can be used to turn off the flow of nitrogen through second cryogenic cooling loop 130 or may be used to change the pressure of nitrogen flowing through second cryogenic cooling loop 130. A throttle valve 160 may be provided in first nitrogen flow line 112 upstream of nitrogen outlets 122 and 132 and downstream of nitrogen intakes 120 and 130. Throttle valve 160 is used to balance the pressure within first nitrogen flow line 112 on either side of throttle valve 160 as needed.

Figure 6:
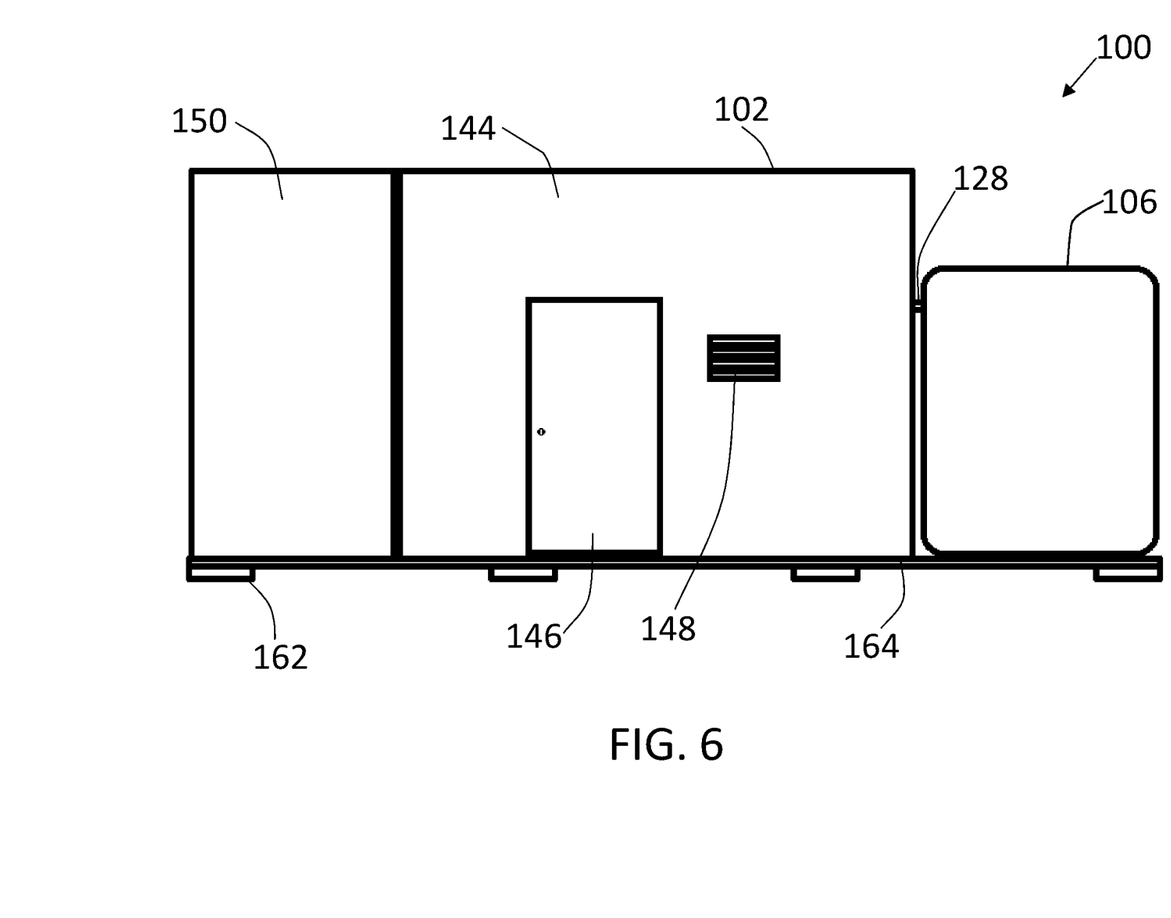
FIG. 6 is a side elevation view of the apparatus shown in FIG. 5.

Referring to FIG. 6, for ease of use, it is beneficial for apparatus 100 to be mounted on a skid 162. It is preferred that skid 162 have a steel grate surface 164 to prevent damage to the skid due to the cold temperatures of the nitrogen. When apparatus 100 is mounted on skid 162, it is easy to transport and set up for use.

For safety purposes, flare line, not shown, may be connected to storage tanks 106. Flare line may be used to flare off gases that may build up and cause pressure within storage tanks 106.

An example how system 10 may be used will now be described. Liquid nitrogen is pumped out of liquid nitrogen storage 12 into first flow line 18. Liquid nitrogen flowing through first flow line 18 is approximately −196° C. A portion of the liquid nitrogen flowing through first flow line 18 is diverted into first cryogenic cooling loop 26a through nitrogen inlet 28a. The liquid nitrogen flowing through first cryogenic cooling loop 26a passes through heat exchanger 32a. Fluid to be cooled, such as C1-C12 natural gases in gaseous form pass into heat exchanger 32a through fluid inlet 33a. The liquid nitrogen causes the temperature of the C1-C12 natural gases in heat exchanger 32a to cool to temperature between −50° C. to −87° C. to liquefy the C3-C12 natural gases. The liquefied C3-C12 natural gases and C1-C2 entrained gases flow out of heat exchanger 32a through fluid outlet 35a into storage tank 106, shown in FIG. 5. A person of skill will understand that fluid outlet 35a may also be connected to a phase separator or other type of tank depending on the final destination of the fluid travelling through fluid outlet 35a. Once nitrogen passing through heat exchanger 32a has cooled the C1-C12 to a temperature between −50° C. to −87° C., the nitrogen will have been warmed up to the temperature between −50° C. to −87° C. This warmer nitrogen flows through nitrogen outlet 30a back into circulation of first flow line 18 and mixes with the −196° C. liquid nitrogen flowing through first flow line 18. Another portion of liquid nitrogen at approximately −196° C. flowing through first flow line 18 may be diverted into second cryogenic cooling loop 26b through nitrogen inlet 28b. The liquid nitrogen flowing through first cryogenic cooling loop 26b passes through heat exchanger 32b. Fluid to be cooled, such as C1-C2 natural gases in gaseous form pass into heat exchanger 32b through fluid inlet 33b. The liquid nitrogen causes the temperature of the C1-C2 natural gases in heat exchanger 32b to cool to a temperature at least −162° C. to liquefy the C1-C2 natural gases. The liquefied C1-C2 natural gases flow out of heat exchanger 32b through fluid outlet 35b into storage tank 106, shown in FIG. 5. Once nitrogen passing through heat exchanger 32b has cooled the C1-C2 to at least −162° C., the nitrogen will have been warmed up. This warmer nitrogen flows through nitrogen outlet 30b back into circulation of first flow line 18 and mixes with the nitrogen flowing through first flow line 18. The nitrogen that has flowed through first flow line 18, first cryogenic cooling loop 32a and second cryogenic cooling loop 32b flows into turbo expander 34. Turbo expander 34 is used to re-cool the nitrogen before flowing through second flow line 42 and into liquid nitrogen storage 12 through inlet 16. Ideally, turbo expander 34 should re-cool the nitrogen to −196° C., however a person of skill will understand that the nitrogen may not be cooled to this extent. Turbo expander 34 is powered by power source 40. Power source 40 may be a natural gas generator. When natural gases are liquefied in system 10, they may be used to power the natural gas generator.

A heat exchanger 52 may be positioned downstream of nitrogen outlets 30a and 30b of cryogenic cooling loops 26a and 26b, respectively. Heat exchanger 52 is used to pre-cool or pre-heat the nitrogen passing through it prior to entering turbo expander 34. Pre-cooling is beneficial for lower loads of nitrogen and for larger volumes. Pre-cooling may improve efficiency within turbo expander 34. Heating of the nitrogen should only occur if there are issues in turbo expander 34 related to saturation of the nitrogen. Heating of the nitrogen may be used to prevent cavitation of the internal mechanisms in turbo expander 34. Generally, however, nitrogen saturation issues can be resolved by oscillating or adjusting the flow rate and volumes of nitrogen travelling through system.

A person of skill will understand that the temperature at which each heat exchanger 32a, 32b, 32c and 32d operates is independent of the others and is dependent upon the fluids to be cooled and products to be collected.

Any use herein of any terms describing an interaction between elements is not meant to limit the interaction to direct interaction between the subject elements, and may also include indirect interaction between the elements such as through a secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A system for a regeneration of nitrogen energy within a closed loop cryogenic system, comprising:
    a liquid nitrogen storage having an inlet and an outlet;
    a first flow line having a first end and a second end, the first end of the first flow line being in fluid communication with the outlet of the liquid nitrogen storage;
    a pump for pumping liquid nitrogen from the liquid nitrogen storage to the first flow line;
    at least two cryogenic cooling loops, the at least two cryogenic cooling loops each having a nitrogen intake in fluid communication with the first flow line and a nitrogen outlet in fluid communication with the first flow line, the liquid nitrogen entering through each of the nitrogen intakes having a consistent temperature, the nitrogen outlets of the at least two cryogenic cooling loops being located, along the first flow line, downstream of the nitrogen intake and upstream a turbo expander, and the at least two cryogenic cooling loops each having a heat exchanger located downstream of the nitrogen intake and upstream of the nitrogen outlet, all of the nitrogen intakes being positioned upstream of all of the nitrogen outlets;
    the turbo expander having an inlet and an outlet, the inlet being in fluid communication with the second end of the first flow line, the turbo expander re-cooling nitrogen flowing through the first flow line and all of the at least two cryogenic cooling loops, and the turbo expander being connected to a power source for operating the turbo expander; and
    a second flow line having a first end and a second end, the first end of the second flow line being in fluid communication with the outlet of the turbo expander and the second end of the second flow line being in fluid communication with the inlet of the liquid nitrogen storage.

2. The system of claim 1 wherein the at least] two cryogenic cooling loops each having a valve positioned between the nitrogen intake and the heat exchanger for controlling a flow of nitrogen through the at least two cryogenic cooling loops independently.

3. The system of claim 1 wherein there is a first cryogenic cooling loop and a second cryogenic cooling loop, a nitrogen intake of the second cryogenic cooling loop being upstream of the nitrogen outlet of the first cryogenic cooling loop.

4. The system of claim 1 wherein a throttle valve is provided in the first flow line upstream of all of the nitrogen outlet of the at least two cryogenic cooling loops and the turbo expander and downstream of all of the nitrogen intake of the at least two cryogenic cooling loops, the throttle valve balancing a pressure in the first flow line.

5. The system of claim 1 wherein a heat exchanger is provided in the first flow line downstream of all of the nitrogen outlet of the at least two cryogenic cooling loops for cooling or heating the nitrogen in the first flow line.

6. The system of claim 1 wherein the nitrogen storage has a vent for venting off excess pressure within the nitrogen storage.

7. The system of claim 1 wherein the power source is a natural gas generator.

8. The system of claim 1 further comprising a surge tank provided in the first flow line upstream of the turbo expander and downstream of all of the at least two cryogenic cooling loops.

9. The system of claim 1 wherein methane gas is added to the nitrogen.

10. The system of claim 1 wherein ethane gas is added to the nitrogen.

11. A method of regenerating nitrogen energy within a closed loop cryogenic system, comprising the steps of:
    pumping liquid nitrogen from a liquid nitrogen storage into a first flow line, the first flow line having a first end and a second end, the first end of the first flow line being in fluid communication with the liquid nitrogen storage;
    flowing at least a portion of the liquid nitrogen through at least two cryogenic cooling loops, the at least two cryogenic cooling loops each having a nitrogen intake and a nitrogen outlet in fluid communication with the first flow line, the liquid nitrogen entering through each of the nitrogen intakes having a consistent temperature, all of the nitrogen outlet of the at least two cryogenic cooling loops being located, along the first flow line, downstream of all of the nitrogen intakes of each of the at least two cryogenic cooling loops and upstream of a turbo expander, each of the at least two cryogenic cooling loops having a heat exchanger located downstream of the nitrogen intake and upstream of the nitrogen outlet, all of the nitrogen intakes being positioned upstream of all of the nitrogen outlets;
    flowing the liquid nitrogen through the turbo expander, the turbo expander having an inlet and an outlet, the inlet being in fluid communication with the second end of the first flow line, the turbo expander re-cooling the liquid nitrogen flowing through the first flow line and the at least two cryogenic cooling loops; and
    flowing the liquid nitrogen through a second flow line, the second flow line having a first end and a second end, the first end of the second flow line being in fluid communication with the outlet of the turbo expander, the second end of the second flow line being in fluid communication with the inlet of the liquid nitrogen storage.

12. The method of claim 11 further comprising the step of passing the liquid nitrogen through a heat exchanger, the heat exchanger being positioned on the first flow line downstream of all of the nitrogen outlet of the at least two cryogenic cooling loops, the heat exchanger cooling or heating the liquid nitrogen passing through.

13. The method of claim 11 wherein there is a first cryogenic cooling loop and a second cryogenic cooling loop, a nitrogen intake of the second cryogenic cooling loop being upstream of the nitrogen outlet of the first cryogenic cooling loop.

14. The method of claim 11 further comprising the step of passing the nitrogen through a surge tank prior to flowing the nitrogen through the turbo expander.

15. The method of claim 11 wherein methane gas is added to the nitrogen.

16. The method of claim 11 wherein ethane gas is added to the nitrogen.

17. A system for a regeneration of nitrogen energy within a closed loop cryogenic system, comprising:
- a liquid nitrogen storage having an inlet and an outlet;
- a first flow line having a first end and a second end, the first end of the first flow line being in fluid communication with the outlet of the liquid nitrogen storage;
- a pump for pumping liquid nitrogen from the liquid nitrogen storage to the first flow line;
- a plurality of cryogenic cooling loops, each of the plurality of cryogenic cooling loops having a nitrogen intake in fluid communication with the first flow line and a nitrogen outlet in fluid communication with the first flow line, the liquid nitrogen entering through each of the nitrogen intakes having a consistent temperature, all of the nitrogen outlets of the plurality of cryogenic cooling loops each being located, along the first flow line, downstream of all of the nitrogen intakes and upstream of a turbo expander, and each of the plurality of cryogenic cooling loops having a respective heat exchanger positioned downstream of the nitrogen intake and upstream of the nitrogen outlet;
- the turbo expander having an inlet and an outlet, the inlet being in fluid communication with the second end of the first flow line, the turbo expander re-cooling nitrogen flowing through the first flow line and the plurality of cryogenic cooling loops, and the turbo expander being connected to a power source for operating the turbo expander;
- a second flow line having a first end and a second end, the first end of the second flow line being in fluid communication with the outlet of the turbo expander and the second end of the second flow line being in fluid communication with the inlet of the liquid nitrogen storage;
- wherein a throttle valve is provided in the first flow line upstream of all of the nitrogen outlets of the plurality of cryogenic cooling loops and downstream of all of the nitrogen intakes of the plurality of cryogenic cooling loops, the throttle valve balancing a pressure in the first flow line.

* * * * *